United States Patent
Poulton et al.

(10) Patent No.: US 6,732,154 B1
(45) Date of Patent: *May 4, 2004

(54) DISTRIBUTION LIMITER FOR NETWORK MESSAGING

(75) Inventors: Craig K. Poulton, Salt Lake City, UT (US); Luke A. Call, Tooele, UT (US)

(73) Assignee: ParaTran Corporation, Salt Lake City, UT (US)

( * ) Notice: Subject to any disclaimer, the term of this patent is extended or adjusted under 35 U.S.C. 154(b) by 779 days.

This patent is subject to a terminal disclaimer.

(21) Appl. No.: 09/586,082

(22) Filed: Jun. 2, 2000

Related U.S. Application Data

(60) Provisional application No. 60/039,341, filed on Mar. 18, 1997.

(51) Int. Cl.[7] .............................................. G06F 15/17
(52) U.S. Cl. ...................................... 709/206; 709/217
(58) Field of Search ................................ 709/206, 232, 709/238, 245, 219, 229, 213, 217, 218, 249; 380/24, 25, 49; 707/10, 206

(56) References Cited

U.S. PATENT DOCUMENTS

| | | | | |
|---|---|---|---|---|
| 5,377,354 A | * | 12/1994 | Scannell et al. | 718/103 |
| 5,414,833 A | * | 5/1995 | Hershey et al. | 713/201 |
| 5,491,820 A | * | 2/1996 | Belove et al. | 707/3 |
| 5,513,126 A | * | 4/1996 | Harkins et al. | 709/228 |
| 5,537,586 A | * | 7/1996 | Amram et al. | 707/3 |
| 5,541,911 A | * | 7/1996 | Nilakantan et al. | 370/422 |
| 5,548,753 A | * | 8/1996 | Linstead et al. | 707/1 |
| 5,606,668 A | * | 2/1997 | Shwed | 713/201 |
| 5,619,648 A | * | 4/1997 | Canale et al. | 709/206 |
| 5,627,997 A | | 5/1997 | Pearson et al. | 395/500 |
| 5,650,934 A | * | 7/1997 | Manduley | 700/215 |
| 5,708,655 A | * | 1/1998 | Toth et al. | 370/313 |
| 5,717,913 A | * | 2/1998 | Driscoll | 707/5 |
| 5,826,022 A | * | 10/1998 | Nielsen | 709/206 |
| 5,832,221 A | * | 11/1998 | Jones | 709/206 |
| 5,864,610 A | * | 1/1999 | Ronen | 379/121.01 |
| 5,878,230 A | * | 3/1999 | Weber et al. | 709/238 |
| 5,884,033 A | * | 3/1999 | Duvall et al. | 709/206 |
| 5,903,878 A | * | 5/1999 | Talati et al. | 705/26 |
| 5,928,333 A | * | 7/1999 | Landfield et al. | 709/245 |
| 5,930,777 A | * | 7/1999 | Barber | 705/40 |
| 5,936,865 A | * | 8/1999 | Pintsov et al. | 700/107 |
| 5,938,725 A | * | 8/1999 | Hara | 709/206 |

(List continued on next page.)

Primary Examiner—Bunjob Jaroenchonwanit
(74) Attorney, Agent, or Firm—Pate & Pierce & Baird

(57) ABSTRACT

A message distribution limiter computer program and method are provided. The method preferably includes receiving a site address of target data stored at a remote site on a computer network; locating the target data stored at the remote site; examining the target data to determine if user addresses are present in the target data; extracting user addresses from the target data; and compiling a database containing the extracted user addresses. The method also preferably includes the steps of downloading the target data to a local memory; locating within the target data one or more embedded site addresses of remote sites on the computer network for locating additional target data referenced within the remote sites; screening the embedded site addresses according to a user-selectable criterion; and screening the target data according to a user-selectable criterion such that user addresses are extracted only from target data meeting the selected criterion. Also included is a mail screening module adapted to place into a network site a user-selectable code indicating whether a selected type of message is desired to be received by a mailbox within the network site.

19 Claims, 6 Drawing Sheets

U.S. PATENT DOCUMENTS

| | | | | |
|---|---|---|---|---|
| 5,940,478 A | * | 8/1999 | Vaudreuil et al. | 379/88.18 |
| 5,943,426 A | * | 8/1999 | Frith et al. | 713/153 |
| 5,944,787 A | * | 8/1999 | Zoken | 709/206 |
| 5,956,483 A | * | 9/1999 | Grate et al. | 709/203 |
| 5,978,842 A | * | 11/1999 | Noble et al. | 709/218 |
| 5,987,471 A | * | 11/1999 | Bodine et al. | 707/103 R |
| 5,999,967 A | * | 12/1999 | Sundsted | 709/206 |
| 6,073,167 A | * | 6/2000 | Poulton et al. | 709/206 |

* cited by examiner

DISTRIBUTION LIMITER FOR NETWORK MESSAGING

RELATED APPLICATIONS

This application claims the benefit of U.S. provisional patent application No. 60/039,341, filed Mar. 18, 1997.

BACKGROUND OF THE INVENTION

1. The Field of the Invention

The present invention relates to the distribution of information over a computer network. More specifically, the present invention relates to computer programs for selectively limiting the bulk distribution of messages over a computer network, and particularly over the Internet.

2. The Relevant Technology

The Internet is fast proving itself to be one of the most significant technological developments of the current era. Originally developed in the United States for military communications, the Internet has now expanded to link computer users world-wide. The Internet is an interconnected system of computer networks of varying types with terminals, usually computer stations, communicating with each other through a common communication protocol, e.g. TCP/IP. Through this interconnected system of computer networks, the Internet serves as the underlying hardware that facilitates a global system of communication known as the world wide web, Piggy-backed onto the public telephone network, the Internet is available to anyone with a telephone line and a computer, though even these minimal requirements may become unnecessary in the near future. Both businesses and private users are taking advantage of the Internet in rapidly increasing numbers for communications of diverse nature.

One reason for the rapid integration of the Internet into society is that the Internet provides efficiencies in communication that are unmatched by other types of communications mediums. Messaging over the Internet is very quick, even to remote locations throughout the world. Responses are also typically very quick. Internet communication is minimally regulated and relatively inexpensive, typically requiring only the cost of a computer terminal and a periodic Internet service provider fee. Additionally, Internet communications are pervasive, providing easy access from every user on the Internet to millions of other users, almost regardless of physical location, Because of these efficiencies, one form of communication that has quickly migrated to the Internet is advertising. Advertisers are able to generate and send bulk mailings at a fraction of the cost of mail, telephone, radio, and other commonly accepted types of advertising. Programs exist that quickly merge commercial advertisement messages with reference lists of Internet user addresses and automatically send out thousands of advertisements in a single day at almost no cost to the sender.

Unfortunately, the indiscriminate nature of broadcast advertising over the Internet has led to a host of problems. In order to deliver a message in volume and thereby take advantage of the efficiencies of the Internet, senders frequently use commercially generated reference lists of Internet user addresses. These reference lists are very labor intensive and costly to compile in any manner other than randomly. Thus, many Internet broadcasters use random lists of user addresses to send their advertising, transmitting messages to a large number of disinterested Internet users for every interested Internet user.

Internet users typically resent this random "junk mail" cluttering up their cyberspace mailboxes. Consequently, random advertising over the Internet is commonly referred to, rather unaffectionately, as "spamming." Angry recipients of unsolicited E-mail advertising have gone so far as to react in simultaneous, damaging, electronic backlashes aimed at particularly notorious junk mail-generating entities.

Regulations have been proposed to limit spamming, but as with every other form of regulation, regulations would limit the freedom of communications that exist on the Internet and would also likely increase the cost of using the Internet to everyone. As with other existing problems on the Internet, Internet users would prefer to regulate themselves.

Accordingly, a need exists for a method or apparatus that could be used by Internet users to maintain or increase the efficiency of advertising that exists on the Internet, while decreasing or eliminating the occurrence thereon of unsolicited mail.

OBJECT AND BRIEF SUMMARY OF THE INVENTION

The apparatus of the present invention has been developed in response to the present state of the art, and in particular, in response to the problems and needs in the art that have not yet been fully solved by currently available technology. Thus, it is an overall objective of the present invention to provide a method and apparatus that overcomes some or all the problems discussed above.

Consistent with the foregoing object, and in accordance with the invention as embodied and broadly described herein, a message distribution limiter program for selectively sending messages to remote terminals of a computer network is provided under the present invention. The message distribution limiter program in one embodiment operates in conjunction with a network, a processor upon which the message distribution limiter program executes, a network interface for communications between the message distribution limiter program and a network, and a memory device for storing the distribution limiter program.

The memory device may, at different times, comprise nonvolatile memory such as a hard drive, a floppy, or cd rom. The memory device may also comprise rom associated with a computer processor. Data structures are stored within the memory device, and comprise a network interface module for receiving an address of target data stored at a remote site on the computer network and for making the target data locally available to one or more of the data structures.

Also included is a search engine for examining the target data made available by the network interface module to determine if user addresses are present in the target data. A further included data structure comprises a user address extraction module for extracting user addresses from the target data. Another provided data structure includes a database compilation module for compiling a database of user addresses from the user addresses extracted by the user address extraction module.

Other optional data structures include a filter for screening the target data according to a selected criterion, such that user addresses are extracted from the target data only when the target data meets the selected criterion. Also optionally included is a site navigator module for locating within the target data referenced site addresses of remote sites on the computer network. The site navigator module may further comprise a filter for screening the site addresses referenced within the target data according to a selected criterion.

Other possible data structures of the message distribution limiter program include a message addressing module for associating the user addresses with messages that are to be transmitted to remote sites on the computer network. Additionally, a message display module for allowing a human user to view the messages after the user addresses have been attached to the messages, to view context data regarding the messages, and to select whether to transmit the messages may also be included. Another possible data structure includes a message transmission module for placing the messages on the network to be transmitted to the remote sites.

Likewise, the message distribution limiter program may include a user interface for providing a human user with a choice of utilizing at least two different types of message screening. The user interface may also provide the human user with the choice of utilizing three or four different types of message screening.

A computer-implemented method for selectively sending messages to remote terminals of a computer network is also provided as part of the present invention. In one embodiment, the method comprises receiving a site address of target data stored at a remote site on the computer network. Additionally, the method may include locating the target data stored at the remote site on the computer network. Also possibly part of the method is examining the target data to determine if user addresses are present in the target data.

The method may also include extracting user addresses from the target data, and compiling a database containing the extracted user addresses. Also, the method may include downloading the target data to a local memory prior to the step of examining the target data. The method may likewise include locating, within the target data, one or more embedded site addresses of remote sites on the computer network for locating target data referenced within the remote sites.

Screening the embedded site addresses according to a selected criterion may also be part of the method. Similarly, screening the target data according to a user-selectable criterion such that user addresses are extracted only from target data meeting the selected criterion may be conducted under the method.

Also included as part of the present invention are data structures for selectively sending messages to remote terminals of a computer network. These data structures may comprise a mail screening module adapted to be incorporated into a computer network site having therein a mail box of a user, the mail screening module being further adapted to contain a user-selectable code indicating whether a selected type of message is desired to be received by the mailbox. Also possibly included is a filter for operating within a search engine for ascertaining from the user-selectable code, when the user-selectable code is embedded within a computer network site, whether a selected type of message is desired to be received by a selected mailbox of the computer network site.

Thus, the present invention provides the advantages of specifically targeting the audience of message campaigns over networks. The high degree of screening limits the distribution of the messages to only those most likely to have interest in the messages. This can go far to alleviate the problem of anger by E-mail recipients barraged by unwanted and irrelevant E-mail.

The screening can occur with a pre-screen search on the Internet, with two filtering operations of one or more filters each, with a user screening according address and context information, and through user interest codes inserted into remote sites and monitored as one of the filtering steps.

The transmission of custom mail messages is quick, convenient, and efficient, and the user is presented with information to evaluate the likelihood of interest in each message quickly without having to access the individual web sites manually.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the invention will be best understood by reference to the drawings, wherein like parts are designated by like numerals throughout.

It will be readily understood that the components of the present invention, as generally described and illustrated in the figures herein, could be arranged and designed in a wide variety of different configurations. Thus, the following more detailed description of the embodiments of the system and method of the present invention, as represented in FIGS. 1 through 6, is not intended to limit the scope of the invention, as claimed, but is merely representative of presently preferred embodiments of the invention.

Figure 1:
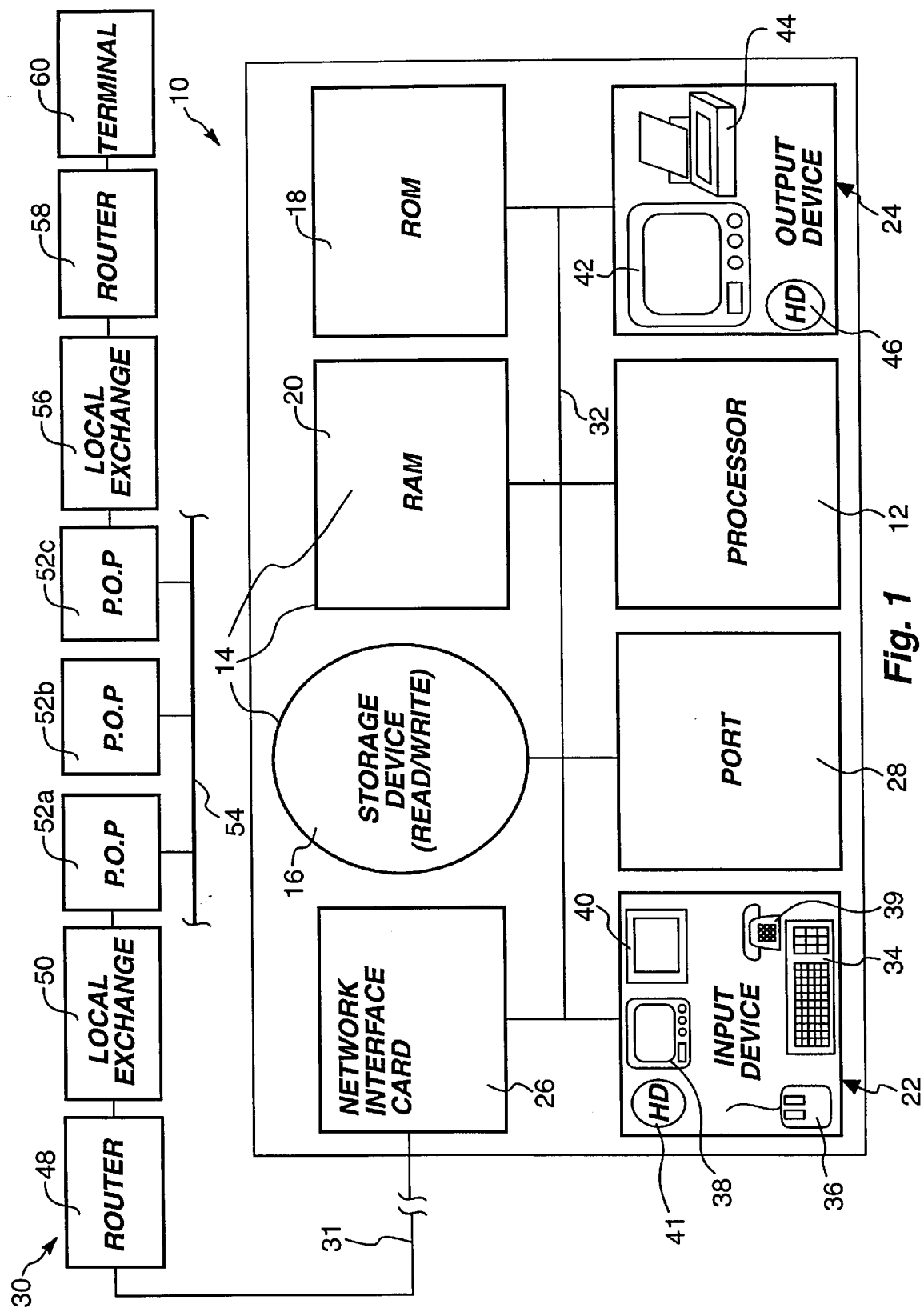
FIG. 1 is a schematic block diagram of an apparatus in accordance with the invention.

FIG. 1 is a schematic block diagram which illustrates an apparatus in accordance with the invention, wherein executables and applications, operating in accordance with the invention, may be hosted on one or more terminals 60 in a network 30. The network 30 may also comprise an interconnected system of networks (Internet), one particular example of which is the Internet and the world wide web supported on the Internet.

FIGS. 2–6 are schematic block diagrams and flow chart diagrams which illustrate in more detail certain embodiments of modules, executables, and data for operating the apparatus of FIG. 1 in accordance with the present invention. FIGS. 2–5 illustrate features and functions available for use in targeting selected users and limiting distribution to non-targeted users in a network messaging campaign.

Referring again to FIG. 1, a computer station 10 typically includes a processor 12. The processor 12 may be operably connected to a memory 14. The memory 14 may include one or more devices such as a hard drive or other non-volatile storage device 16, a read-only memory 18 (ROM) and a random access volatile memory 20 (RAM).

The computer station 10 may also include an input device 22 for receiving inputs from a user or another device. Similarly, an output device 24 may be provided within or accessible from the computer station 10. A network interface card 26 or port 28 may be provided for connecting to outside devices, such as the network 30. In the case where the network 30 is remote from the computer station, the network interface card 26 may comprise a modem, and connect to the network 30 through a local access line 31, typically a telephone line.

Internally, a system bus 32 may operably interconnect the processor 12, memory devices 14, input devices 22, output devices 24, network card 26 and port 28. The system bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply the telephone line 31, may be used for communication with other devices, with a user, or the like. Similarly, a scanner 40 may be used to receive graphical inputs which may or may not be translated to other character formats. A hard drive 41 or other memory device 14 may be used as an input device whether resident within the computer station 10 or some other terminal 60 on the network 30, or from another interconnected network (e.g. a network formed by a P.O.P. 52c, a local exchange 56, a router 58, and the terminal 60).

Output devices 24 may likewise include one or more physical hardware units. For example, in general, the port 28 may be used to accept inputs and send outputs from the computer station 10. Additionally, a monitor 42 typically provides outputs to a user for feedback during operation of the computer station 10, e.g., for assisting two-way communication between the processor 12 and a user. A printer 44 or a hard drive 46 may be used as output devices 24 for outputting information generated or otherwise collected withing the computer station 10.

In general, the computer station 10 may be connected as a terminal 60 to the network 30. In one manner of connection, common on the Internet, the computer station 10 is connected through a modem 26 through the local access line 31 to a router 48. The router 48 is typically a local telephone presence managed by a local service provider. The router directs communication to a local exchange 50, which is typically a public telephone company switching center.

Once within the public telephone company, the communications are routed to a regional switching center, or point of presence 52a (P.O.P.). The P.O.P. 52a connects over a backbone 54 with the points of presence, such as P.O.P. 52b and P.O.P. 52c, which in turn connect other terminals such as the terminal 60 through local exchanges such as the local exchange 56 and routers such as the router 58. As other manners of network interconnection exist and are well known, the illustrated configuration is given only as one representative example.

In general, the network 30 may comprise a single local area network, a wide area network, several adjoining networks, an intranet, or as in the manner depicted, a system of interconnected networks such as the Internet. The individual terminals 60, 10 on the network may have varying degrees and types of communication capabilities and logic capability. Different communication protocols, e.g., ISO/OSI, IPX, TCP/IP, may be used on the network, but in the illustrated case of the Internet, single, layered communications protocol (TCP/IP) enables communications between the differing networks and terminals.

In general, the network 30 allows terminals such as the terminals 60, 10 to communicate with each other, with application servers (not depicted), and with input/output resources such as the printer 44 or scanner 40. In so doing, a communication link may exist, in general, between any pair of devices.

Figure 2:
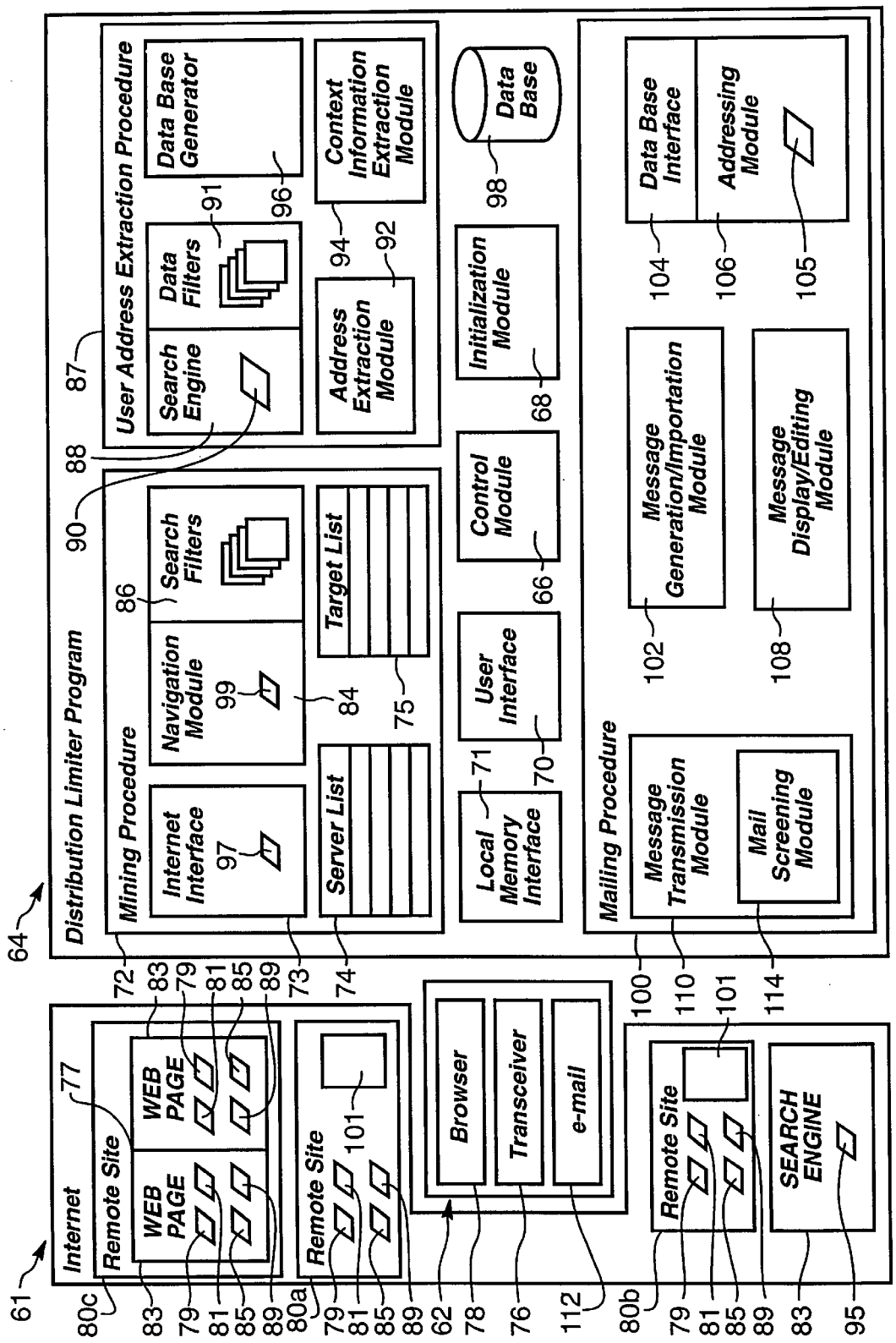
FIG. 2 is a schematic block diagram of a distribution limiter operating within a computer station of FIG. 1 and also illustrating the interaction of the distribution limiter with an interconnected system of networks of FIG. 1.

FIG. 2 shows a specific example of the apparatus of FIG. 1 in a schematic block diagram with blocks representing data structures used in an E-mail distribution limiter program 64 (program) of the present invention. The terms "program" and "module," as used herein, are intended to mean an instruction or group of instructions executable upon a processor 12. In the preferred embodiment the program 64 is written in the Java programming language due to its universal application over the Internet. Of course, the program 64 could be written in any other suitable programming language.

In the embodiment of FIG. 2, the network 30 of FIG. 1 is depicted as an Internet 61, which may support the world wide web. Also seen in FIG. 1 are the program 64 operating within the memory 14 of FIG. 1, and an Internet interface 62 linking the Internet 61 with the program 64. Typically, much of the Internet interface 61 resides in the memory 14 of FIG. 1, but some portions, such as transceiver firmware or modem firmware may reside in the network interface card 26 of FIG. 1, and other portions, such as TCP/IP protocol interpretation and transmission software may reside on the Internet 61 itself Typically, many of the terminals 60, 10, represented in FIG. 2 as remote sites 80a, 80b, and 80c, allow remote users access to data stored within the remote sites 80. One type of remote site 80 that allows access to stored data is a web site 77. A web site 77, as generally understood, is typically made up of web pages 83 arranged in hierarchical order and referenced by site addresses 85 which may take the form of Uniform Resource Locators (URLs).

Commercial web browsers such as an Internet browser 78 allow Internet users to navigate the web sites 77 and to transition smoothly between web sites 77 and related web pages 83 by accessing embedded and highlighted "hot links" containing the site address 85 and associated code in the HTML language of the Internet that together provide the user immediately with access to the referenced site. Alternatively, the site address 85 may be entered into a command line of the browser 78 which will then provide access to the designated web site 77 or web page 83.

Often, the web sites 77 contain one or mor user mailboxes 101 for electronic mail (E-mail) communications with individuals to whom the mailboxes 101 are assigned. For instance, many businesses have web sites 77 describing the business and possibly advertising thereon the nature of the businesses goods or services. Often, mail boxes of persons at the businesses will be associated with the web site 77. The web sites 77 often list the Internet addresses of these mailboxes 101 together with the title or responsibilities (e.g., sales) of the assigned Internet user so that other interested Internet users may contact the assigned Internet user at the assigned Internet user's mailbox 101. These listings are sometimes located at a single web page 83 within a web site 77, or may be distributed throughout the web site 77.

In order to avoid the problems described in the Background Section above pertaining to indiscriminate broadcast E-mailing of bulk advertisements to Internet user mailboxes 101, and to facilitate selective advertising over networks in general, the E-mail distribution limiter program 64 of the present invention is provided. A control module 66 of the program 64 provides interaction and coordination between the different data structure components of the program 64. User communications through the user interface 70 are also coordinated by the control module 66.

An initialization module 68 initializes all variables and parameters during the program startup. A local memory interface 71 cooperates with others of the data structure components of the program 64 for storing data in the memory 14 of FIG. 1 and providing that data when needed to the various data structure components.

Major functional components of the program 64, broken up here for convenience of discussion, include a mining procedure 72, a user address extraction procedure 87, and a mailing procedure 100. Included in the mining procedure 72 is an Internet interface 73. The Internet interface 73 is specific to the program 64 and operates in conjunction with the Internet interface 62, which is not necessarily specific to the program 64, to transfer data between the program 64 and the Internet 61. The Internet interface 73 may comprise or employ a commercially available program for downloading data from the Internet 61. One such commercially available program is the WebWhacker 1.0 program from the ForeFront Group.

A navigation module 84 operates in conjunction with the Internet interface 73 to find related data locations within the target data 90 and search data 99. Thus, for instance, if an initial site address 85 leads the program 64 to download the contents of a remote site 80, typically a web page 83, the navigation module 99 is used to examine the target data 90 contained in the web page 83, 85 for site addresses 85 leading to other web pages 83 in the web site 77 or at other remote sites 80. These site addresses 85 are then added to the search list 74 as addresses of further search data 97 or to the target data list 75 as addresses of target data 90.

One or more site filters 86 are used by the navigation module to determine whether a site address 85 should be extracted for later use in downloading further target data 90. The site filters 86 may include, for instance, a criterion that the site address 85 must refer to a web page 83 that is lower or equal in hierarchical order to the web page 83 on which the site address 85 was located. Failure to do this would lead to a scope of the search that would be unmanageable. Additional site filters 86 may include subject matter terminology or "keywords" according to which the context information surrounding the site address 85 might be searched. The site filters 86 may also include a selected maximum number of site addresses 85 to be extracted from a single remote site 80, web site 77, or web page 83. Additionally, the site filters 86 may also include a maximum hierarchical depth within a web site 77 from which site addresses 85 may be extracted.

A search list 74 may be used to store a list of extracted site addresses 85 addressing remote sites 80, web sites 77, or web pages 83 that are classified by the program 64 as containing search data 99 from which other site addresses 85 may later be extracted by the navigation module 99. The search list 74 is shown as a first in last out (FILO) stack, but of course on skilled in the art will recognize that the search list 74 could also comprise any other type of data structures suitable for organizing and storing data.

A target list 75, similar to the search list 74, may be used to store a list of site addresses 85 addressing remote sites 80, web sites 77, or web pages 83 that can be classified as containing target data 90 from which user addresses 79 may be extracted by the search engine 88. The target list 75 is also shown as a FILO stack, but similarly could comprise other types of data structures suitable for organizing and storing data.

Within the user address extraction procedure 87, a search engine 88 is used to search the target data 90, typically the contents of specific web pages 83, for user addresses 79 and related context information 81. The context information 81 may be textual information found in the target data 90 proximate the user address 79, and may be a few words or lines, or up to an entire web page 83 or web site 77. The context information 81 may also include the site address 85, and the user addresses 79 located within the web site. The search engine 88 may be, for instance, a text searching routine.

Data filters 91 may be associated with the search engine 88 and are used by the search engine 88 to determine whether the user would be interested in a message to be sent by the program 64. The data filters 91 may comprise user-entered criteria such as descriptive words, combinations of words, or phrases to which the context information 81 is compared. The words may be combined together with Boolean operators.

Depending upon whether the descriptive words appear or do not appear in the context information 81, the user to which the user address 79 refers is considered to be interested or not interested. The data filters may also comprise words in the user address 79, such as the term "web master," or "sales." An additional data filter 91 may comprise a user interest code query to identify embedded files or codes within the target data 90 that show an interest or lack of interest in certain types of messages.

The data filters 91, like the site filters 86, may be permanently embedded in the program 64, but it is preferred that a user be given the option, through the user interface 70, to select which of the data filters 91 the user wishes to employ for a particular messaging campaign. Thus, the user may select and configure a large number of filters, a minimal number, or no filters at all.

Additionally, the user may select, through the user interface 70, which of the site filters the user wishes to employ. The user may accordingly determine whether the navigator module 84 extracts site addresses 85 only from web pages equal to or below the hierarchical level of a web page in which site addresses 85 are found, whether the navigator module 84 stops extracting site addresses 85 at a certain number from each web site or web page, etc.

An address extraction module 92 is also provided in the user address extraction procedure and is used to extract user addresses 77 identified by the search engine 90 from the target data 90. Similarly, a context information extraction module 94 extracts context information 81 from the target data 90. Preferably, the extracted user addresses 77 and context information 81 are organized and stored in a database 98. A data base generation module 96 may be used to create the database 98, format the data base 98, and/or compile the extracted user addresses 79 and associated context information 81 that have been stored within the database 98.

The mailing procedure 100 includes a message generation/importation module 102 by which either a user either prepares a message 105 within the program 64 or a previously prepared message 105 is imported into the program 64. A database interface 104 communicates with the database 98 to receive the user addresses 81, which are merged with the message documents 105 by an addressing module 106.

A display/editing module 108 allows a user to view the user address 85 now associated with each message document 105, together with the associated context information 81 for each user address 85. A mail transmission module 110 cooperates with the network interface 62 to automatically transmit the message documents 105 to mail boxes 101 addressed by the user addresses 85 within the message documents 105. In so doing, a commercial E-mail program 112 may be used. One example of such a program is the Eudora Lite E-mail program from QualComm, Inc.

A mail screening module 114 may also be incorporated into the message document 105. The mail screening module is preferably a separately executable program for distribution to the remote sites 80a, 80b, and 80c. Thus, the mail screening module 114 may be attached to the message documents 105 so that remote users may detach the mail screening modules 114 and incorporate the mail screening module 114 into their respective remote sites 80a, 80b, and 80c. Alternatively, information regarding where to purchase, download, or otherwise access the mail screening module 114 may be attached to the message documents 105.

Thus, if a remote user receives an unwanted message document 105 from the program 64, regardless of who sent the message document 105, the remote user can thereafter prevent such unwanted message documents 105 from being sent to his mail box 101 by executing the mail screening module 114. The mail screening module allows the operator of a web site 77 to select user interest codes 89 and insert the user interest codes 89 into the web site 77 to notify the program 64, or other similar programs, whether the remote users at the web site 77, collectively or individually, desire to receive messages pertaining to certain subject matter. These user interest codes 89 are then examined by one of the filters 86, 91, as discussed above, in determining whether to extract user addresses from particular remote sites 80.

The user interest codes 89 are preferably inserted into a MAIL TO: link embedded in the HTML language of the web sites. An example of such a link is:

<a href="mail to:recipient_name@somedomain.com">Here is an email address link</a>

Other types of information that may be inserted into the links include "bulkmail='none'" to indicate that no bulk mail is desired, and "bulkmail='limited' topics='insurance'" to indicate that bulk advertising messages are desired only that relate to insurance. The system would also allow Boolean operators and wild card operators as well as modifiers to indicate that topics related to an indicated topic or list of topics are desired. A code such as a "Meta" could be used to indicate that the particular user interest code 89 refers to all user addresses on a web site, or alternatively, separate user interest codes 89 could be included for each user address.

User interest codes 89 could also be used to indicate that mail is desired only if the sender pays into an account a payment of money or other tender to signify that the user at the mailbox 101 referenced by the user address will receive and read E-mail messages generally or regarding specific topics, only if a certain amount of money is paid to the user at the mailbox 101. An account in "cyber cash" could then be specified, or arrangements for some other type of payment could then be referred to in the user interest code 89.

Including the mail screening module 114 or at least information about where to acquire the mail screening module 114 with the messaging document 105 would allow remote users to block or solicit certain types of mail, thereby ensuring that further messaging documents 105 are sent only to remote sites 80a, 80b, and 80c where the receipt of the messaging documents 105 is desired.

The mail screening module 114 may also be built into E-mail programs 112 and otherwise made easily available. In this manner, the use of the mail screening module 114 could become a common standard for adoption across the entire Internet 61.

FIGS. 3 through 6 illustrate a method associated with the apparatus and data structures of FIGS. 1 and 2. The method is illustrated in three procedural components corresponding to FIGS. 3, 4 and 5, and 6 for convenience of discussion. The method is described in terms of the embodiment of FIG. 2, wherein the network 30 over which messages are to be sent is the Internet 61. Nevertheless, one skilled in the art will readily recognize the parallel concepts between the Internet 61 and other types of networks 30 and will be able to apply the discussion to use the claimed method and apparatus with other types of networks 30.

Figure 3:
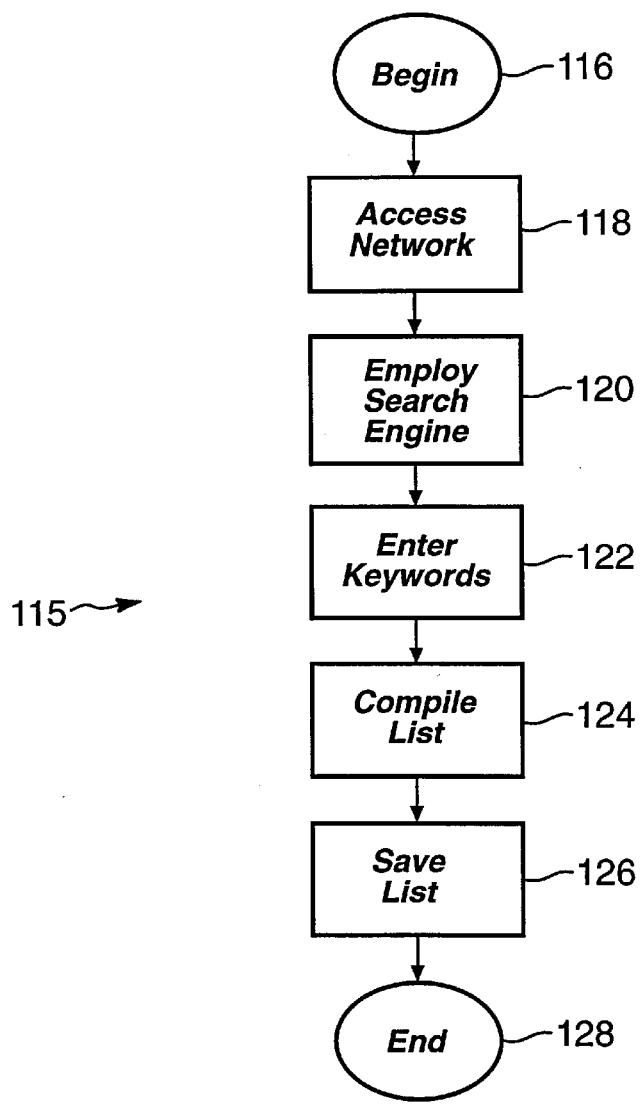
FIG. 3 is a flow chart diagram of an optional preliminary pre-search procedure of a method for use with the apparatus illustrated in FIGS. 1 and 2.

Referring now to FIG. 3, FIG. 3 is a flow chart diagram illustrating an optional preliminary pre-search procedure 115 of a method of the present invention for use with the apparatus illustrated in FIGS. 1 and 2. The pre-search procedure 115 may be implemented by a human user with the use of software, or in an alternate embodiment, is implemented entirely by a computer program. In either case, the pre-search procedure 115 is preferably implemented on the computer station 10 or a similar node 60 of the network 30 of FIG. 1.

At a begin step 116, the pre-search procedure 115 begins. At an access network step 118, a user or executable program gains access to the network 30 of FIG. 1. This is typically done with the use of the browser 78 of FIG. 2 and the network interface card 26 of FIG. 1. The user or computer program then conducts an employ search engine step. The search engine may be, e.g., a search engine 88 operating within an executable program such as the program 64 of FIG. 2. More preferably, the search engine is a commercially available search engine 83 available over the Internet through the browser 78.

Criteria for the search are then entered into the search engine 83 as keywords in the enter keywords step 122. The key words are used for screening the remote sites 80 of FIG. 2 from which target data 90 will be extracted. The same keywords may be employed as a site filter 86 or data filter 91 in later steps. The search engine 83 searches the remote sites 80 for the occurrence of the keywords. If the key words appear in a particular remote site 80, the site address 85 associated with the remote site 80 is saved into a search result list 95 at the compile list step 124. When the search is completed, the search result list 95 is saved to a location on the Internet 83 having its own site address 85 at the save list step 126.

The procedure then comes to an end at end step 128. It should be noted that this procedure is optional under the method of the present invention. Furthermore, the pre-search procedure 115 could be conducted entirely by a computer station 10, entirely by a human, or in a combination of steps conducted by the computer station 10 and steps conducted by the human.

Figure 4:
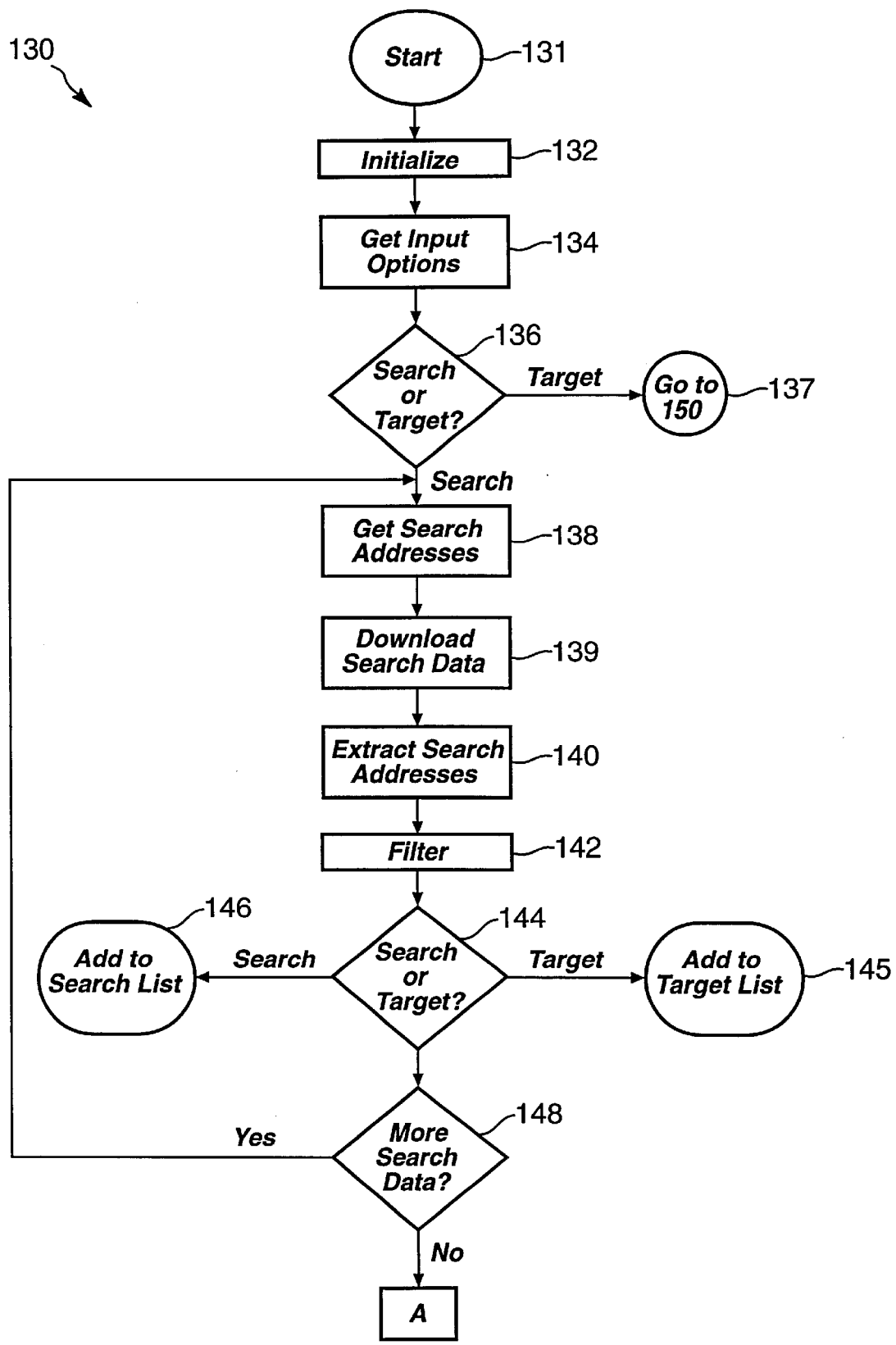
FIG. 4 is the first half of a flow chart diagram of a searching and extraction procedure of the method illustrated in FIG. 3.
Figure 5:
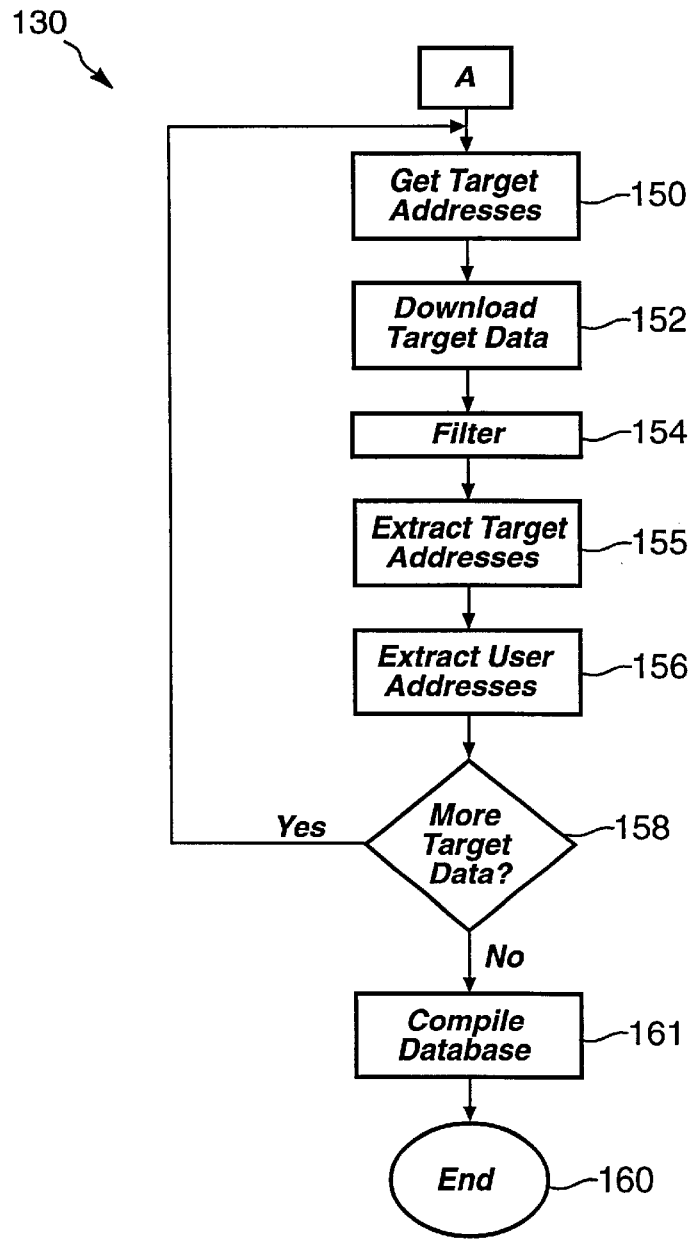
FIG. 5 is the first half of the flow chart diagram of FIG. 4.

FIG. 4 is the first half of a flow chart diagram of a searching and extraction procedure 130 of the method of the present invention. The searching and extraction procedure 130 initiates at a start step 131. Thereafter, at an initialize step 132, variables are initialized and parameters are located as is standard with most computer programs. Additionally, a user interface 70 is preferably displayed on the monitor 42 of FIG. 1 for viewing by the human user.

At the get input data step 134, the user selects among options presented by the user interface 70 to initialize a network searching and mailing campaign. The user also decides on the level of screening of user addresses 79 and makes his/her selection through the user interface 70. If key word filtering is desired, the user enters the appropriate keywords. These key words may be the same keywords used in the pre-search procedure 115 of FIG. 3.

The user also enters an initial site address 97 that is to be searched by the mining procedure 86 or that is to serve as target data 90 for the user address extraction procedure 87. The user also indicates whether the initial site address 97 refers to search data 99 or target data 90. The control module 66 of the program 64 inputs the above-described input data and routes the input data to the required locations. For instance, the initial site address 97 may be routed to the Internet interface 73.

The initial site address 97 may refer to the address of the search results list 95 that resulted from the pre-search procedure 115 of FIG. 3. Alternatively, the address data 85 may be the address of an index of remote sites 80 on the Internet 61 or some other user-selected web site 77 or remote site 80.

At a search or target query step 136, the control module 66 may check to see whether the user indicated that the address data 85 input during the get input data step 134 is search data 99 or target data 90. If indicated to be target data 90, the searching and extraction procedure 130 jumps to the get target address step 150 at a "go to 150" step 137. If indicated to be search data 99, the searching and extraction procedure 130 progresses to a get search address step 138, where the site address 85 or search results list 95 is sent to the Internet interface of FIG. 2.

At a download target data step 139, the Internet interface 73 interacts with the transceiver 76 of FIG. 2 to access the remote site 80 referred to by the initial site address 97. The search data 99 located at this site is then downloaded into the memory 14 for use by the navigation module 84 in filtering and extracting embedded addresses 85 of other remote sites 80. Thus, at the extract search addresses step 140, the navigation module 84 extracts the embedded addresses 85. The site filters 86 may be used to screen the remote sites 80 from which the embedded addresses 85 are removed by examining and screening the text surrounding the embedded addresses 85.

At a search or target query step 144, the control module 66 determines whether each of the embedded addresses 85 discovered in the extract search addresses step 140 is to be classified as referring to search data 99 or target data 90. This is an optional embodiment of employing the method of the present invention. In a further optional embodiment, all addresses 85 are considered to refer to target data 90, and steps 136–148 are eliminated.

In a further optional embodiment, the criterion for the "search or target?" query step 144 is whether the embedded site address 85 is located at a remote site 80 other than the remote site 80 from which it was extracted. If so, the embedded site address 85 is classified as referring to target data 90. Accordingly, if the embedded site address 85 is located within the same remote site 80 (though possibly within other web pages 83), the embedded site address 85 is classified as referring to search data 99. In this manner, each remote site on the search result list 95 would be examined by the navigation module 84 as search data 99 and all site addresses 85 therein that refer to other remote sites would be examined later by the search engine 88 as target data 90.

This embodiment is currently preferred for use with the pre-search procedure 115, because remote sites 80 identified by the pre-search procedure 115 are screened according to selected criteria and are more likely to be interested in a message document 105 than remote sites 80 which are addressed in the identified remote sites 80a. Accordingly, remote users at site addresses 85 of web pages 83 found within the identified remote sites 80 are similarly likely to be more interested in the messaging document 105 than other remote sites whose site addresses 85 are found therein.

In an alternative embodiment, the embedded addresses 85, referring to web pages 83 or remote sites 80 in which no other addresses 85 appear, may be classified as referring to target data 90, while those embedded addresses 85 referring to web pages 83 or remote sites 80 in which other addresses 85 do appear may be classified as referring to search data 99. In this manner, each located remote site 80 will be thoroughly searched for user addresses 85 and each web page 83 of each located web site 77 will be searched for user addresses 79 (subject of course to the filters 86, 91).

This embodiment will return more user addresses, but is less selective than the previously discussed embodiment. Searches of index lists or commonly known industry sites might most profitably be searched in this manner.

If the result of the search or target query step 144 is that the data is search data 99, the embedded site address 85 is placed on the search list 74 at the add to search list step 146. If the result is that the data is 90 data, the embedded site address 85 is placed on the target list 75 at the add to target list step 145.

The search list 74 is checked at the "more search data?" query step 148 to see if more addresses 85 remain. If so, the searching and extraction procedure 130 loops up to the get search address step 138. If not, the searching and extraction procedure 130 proceeds to the get target address step 150 of FIG. 5. At the get target address step 150, the top site address 85 on the target stack 75 is accessed and placed in the Internet interface 97, which interfaces with the Internet 61 through the transceiver 76 and the network interface card 26. The remote site 80 referred to by the top site address 85 is thereafter downloaded into the memory 14 through the local memory interface 71 for use as target data 90 by the search engine 88 at the download target data step 152.

The search engine 88 optionally examines the target data 90 to extract site addresses 85 as indicated at the extract target addresses step 155. In so doing, the navigation module 84 and site filters 86 may be used. This step may be eliminated in embodiments where all embedded site addresses 85 have been previously removed. The target data 90 is then searched for user addresses 79 and optionally filtered with the data filters 91 at a filter step 154. The level of filtering depending on what options the user has selected. User addresses 79 are extracted at an extract user addresses step 166.

The target list 75 is again examined at the "more target data?" query step 158 to determine whether more target data 90 exists. If so, the searching and extracting procedure 130 loops back up to the get target address step 150. If not, the database 98 is compiled by the database generator 96 in a compile database step 161. Of course, the database 98 could be compiled prior to user address 77 extraction and user addresses 79 and context information 81 placed in the database 98 during the course of user address extraction. A separate compile database step 161 may still be used at this point, however, for formatting purposes. The searching and extracting procedure 130 ends at an end step 160. In an alternative embodiment, the target data is downloaded at once and saved into memory 14 and once downloaded, is all searched at once.

Figure 6:
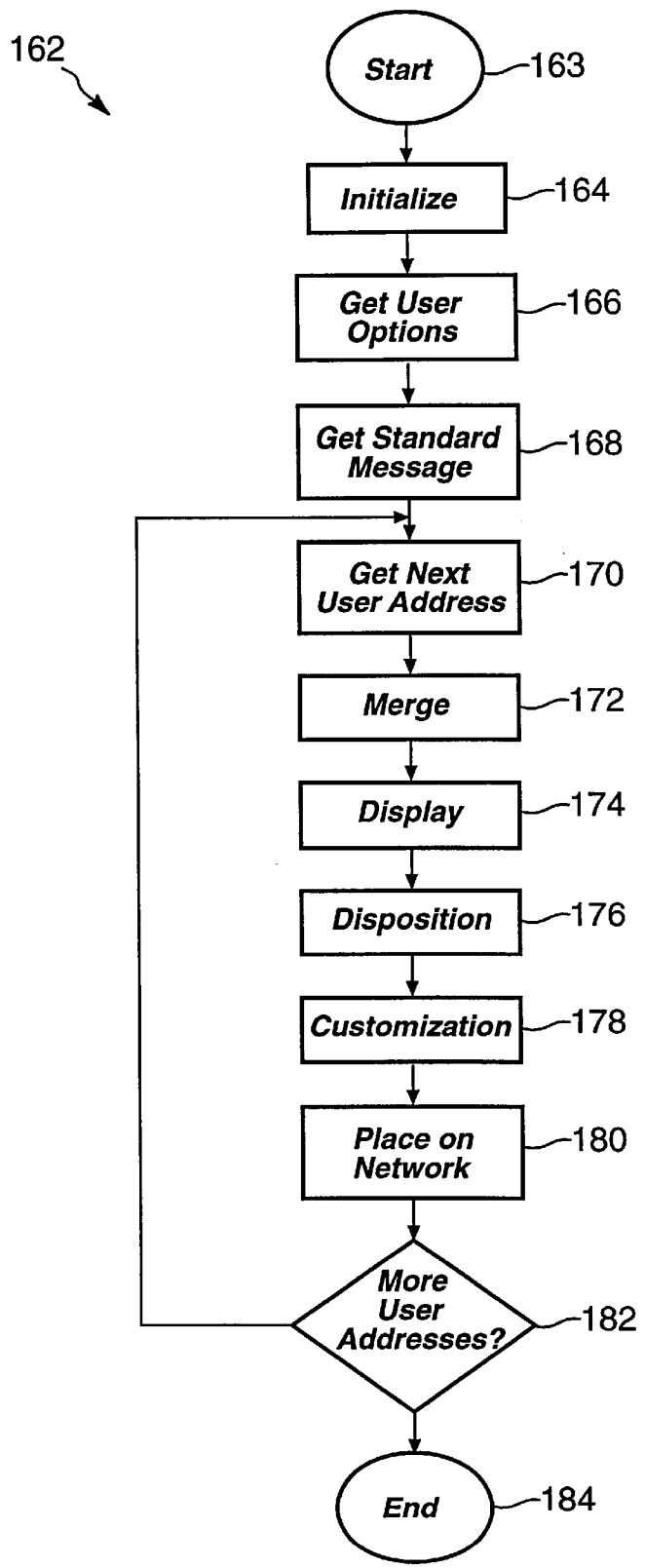
FIG. 6 is a flow chart diagram of an editing and mailing procedure of the method illustrated in FIGS. 3 and 4.

FIG. 6 is a flow chart diagram of an editing and mailing procedure 162 of the method illustrated in FIGS. 3 and 4. A start step 163 begins the editing and mailing procedure 162. Typically, the editing and mailing procedure 162 is initiated from a main menu of the user interface 70 that is initiated during the searching and extracting procedure 130 of FIGS. 4 and 5. Nevertheless, the mailing procedure 100, like the user address extraction procedure 87 and the mining procedure 86 could be initiated independent of the other listed procedures, and indeed, each could comprise a separately compiled computer program.

The editing and mailing procedure 162 is initialized at an initialize step 164. A get user options step 166 receives input data from a user in the manner described above for the get input data step 134. At a get standard message step 168, a message document 105 that is to be selectively distributed over the Internet 61 with the program 64 is supplied. As discussed, the message document 105 could be generated within the message generation/importation module 102, or separately generated and imported into the message generation/importation module 102.

At a get next user address step 170, the addressing module 106 receives a user address 79 from the database 98 and merges the user address with a message document 105 through the data base interface 104. The context information 81 corresponding to the user address 79 is preferably also identified with or otherwise correlated with the message document 105 for use by the display/editing module.

The procedure that occurs during the display step 174 is preferably selected by the user prior to initiation of the editing and mailing procedure 162. Thus, in one embodiment the user is presented with options regarding the amount of consideration to be given to each message document 105. For instance, the user might select to merely send each of the message documents 105 straight through to the Internet 61, the user might choose to view the user address 85 associated with each message document 105 prior to sending, and could might elect to view the context information associated with each message document 105 as well as the amount of context information presented, and might also elect whether to view and edit each message document 105.

The user may be presented with a selection of choices during the display step 174 regarding the addressed message document 105, and at a disposition step 176 uses the displayed address 79 and context information 81 to make the choices. Preferably, the choices are made by a single mouse click or similar indication on one of a series of choices presented in menu fashion.

Among the choices presented to the user may be (a) sending the message document straight through to the identified mail box 101; (b) not sending the message document 105 and deleting the associated user address 79 from the database 98; (c) editing the message document 105 to customize it to the user address 79 and context information 81; (d) ignoring the message document but allow the user address 79 and context information 81 to remain in the database 98; (e) add certain information in the user address 79 or context information 81 into a specialized database, such as company information, product information, etc.; (f) go directly to the web page; and (g) dial an associated telephone number extracted as part of the context information 81.

Combinations of the listed choices could also be presented. Thus, for instance, telemarketing companies might select to pull up the web site 77 and the telephone number, automatically dial the telephone number, and have the web site 77 in front of them during the solicitation. Custom messages could then be sent according to the results of the solicitation.

If the editing choice was selected, the user is presented with an editing window where the user is able to customize the message document 105. Alternatively, certain customization options such as automatic insertion of fields might be presented to the user from which the user is allowed to choose. The cursor may also be automatically positioned for the user at selected insertion points. If the user opted to send the message document 105, the mail document 105 is transmitted to the mailbox 101 referenced by the user address 79 through the mail transmission interface. The transceiver 76 and the network interface card 26 are also availed in sending the message document 105. In addition, the E-mail program 112 may also be used.

The mail screening module 114 or information regarding how to access the mail screening module 114 may be attached to the message document to enable the remote users to insert user interest codes 89 into the remote sites 80, as discussed above.

At a "more user addresses?" query step 182, the database is checked to see if more user addresses 79 are present. If so, the editing and mailing procedure 162 branches back up to the get next user address step 170 to prepare and send a subsequent message document 105. If not, the editing and mailing procedure 162 terminates at an end step 184.

A test mode module may also be included wherein users are allowed to simulate a mailing campaign to learn the use of the program 64 and its advantages before actually sending mail documents 105 across the Internet.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer readable medium containing computer code for execution by a computer and tangibly embodying therein data structures for selectively sending messages to remote terminals of a computer network, the data structures comprising:
   a. a network interface module for receiving an address of target data stored at a remote site on the computer network and making the target data locally available to one or more of the data structures;
   b. a search engine for examining the target data made available by the network interface module to determine if user addresses are present in the target data;
   c. a user address extraction module for extracting user addresses from the target data; and d. a database compilation module for compiling a database of user addresses from the user addresses extracted by the user address extraction module.

2. The computer readable medium of claim 1, wherein the search engine further comprises a filter for screening the target data according to a selected criterion, such that user addresses are extracted from the target data only when the target data meets the selected criterion.

3. The computer readable medium of claim 1, wherein the data structures further comprise a site navigator module for locating within the target data referenced site addresses of remote sites on the computer network.

4. The computer readable medium of claim 3, wherein the site navigator module further comprises a filter for screening the site addresses referenced within the target data according to a selected criterion.

5. The computer readable medium of claim 1, wherein the data structures further comprise a message addressing module for associating the user addresses with messages that are to be transmitted to remote sites on the computer network.

6. The computer readable medium of claim 5, wherein the data structures further comprise a message display module for allowing a human user to view the messages after the user addresses have been attached to the messages, to view context data regarding the messages, and to select whether to transmit the messages.

7. The computer readable medium of claim 1, wherein the data structures further comprise a user interface for providing a human user with a choice of utilizing at least two different types of message screening.

8. The computer readable medium of claim 7, wherein the user interface provides the human user with the choice of utilizing at least three different types of message screening.

9. The computer readable medium of claim 1, further comprising a mail screening module adapted for use by a remote site for informing the search engine when examining target data from the remote site whether a selected type of message is desired to be received by a user through the remote site.

10. A computer-implemented method for selectively sending messages to remote terminals of a computer network, the method comprising:

a. receiving a site address of target data stored at a remote site on the computer network;

b. locating the target data stored at the remote site on the computer network;

c. examining the target data to determine if user addresses are present in the target data;

d. extracting user addresses from the target data; and e. compiling a database containing the extracted user addresses.

11. The method of claim 10, further comprising downloading the target data to a local memory prior to the step of examining the target data.

12. The method of claim 10, further comprising locating, within the target data, one or more embedded site addresses of remote sites on the computer network for locating target data referenced within the remote sites.

13. The computer readable medium of claim 12, further comprising screening the embedded site addresses according to a selected criterion.

14. The method of claim 10, further comprising screening the target data according to a user-selectable criterion such that user addresses are extracted only from target data meeting the selected criterion.

15. The method of claim 10, further comprising associating the user addresses to messages for transmitting the messages to selected remote sites on the computer network.

16. The method of claim 10, further comprising displaying the messages to a human user to allow the human user to view and edit the messages after the user addresses have been attached to the messages.

17. The method of claim 10, wherein the target data has been screened by a user using an Internet searching engine prior to the step of receiving an address of target data.

18. The method of claim 10, further comprising searching for embedded codes within the target data that indicate whether a selected type of message is desired to be received by a network user at a remote site.

19. The method of claim 10, further comprising searching for embedded codes within the target data that indicate whether the network user at the remote site is willing to read a message in return for a payment to the network user.

* * * * *

UNITED STATES PATENT AND TRADEMARK OFFICE
CERTIFICATE OF CORRECTION

| | |
|---|---|
| PATENT NO. | : 6,732,154 B1 |
| APPLICATION NO. | : 09/586082 |
| DATED | : May 4, 2004 |
| INVENTOR(S) | : Craig K. Poulton and Luke A. Call |

It is certified that error appears in the above-identified patent and that said Letters Patent is hereby corrected as shown below:

At column 1, line 6, the recitation of priority should read --This application is a continuation of U.S. Application Serial No. 09/040,907 filed March 18, 1998, which claims the benefit of U.S. Provisional Application Serial No. 60/039,341 filed March 18, 1997.--.

Signed and Sealed this

Fifteenth Day of January, 2008

JON W. DUDAS
*Director of the United States Patent and Trademark Office*